Jan. 8, 1935.   1,987,441
PHOTOMETRIC APPARATUS
Filed March 10, 1933
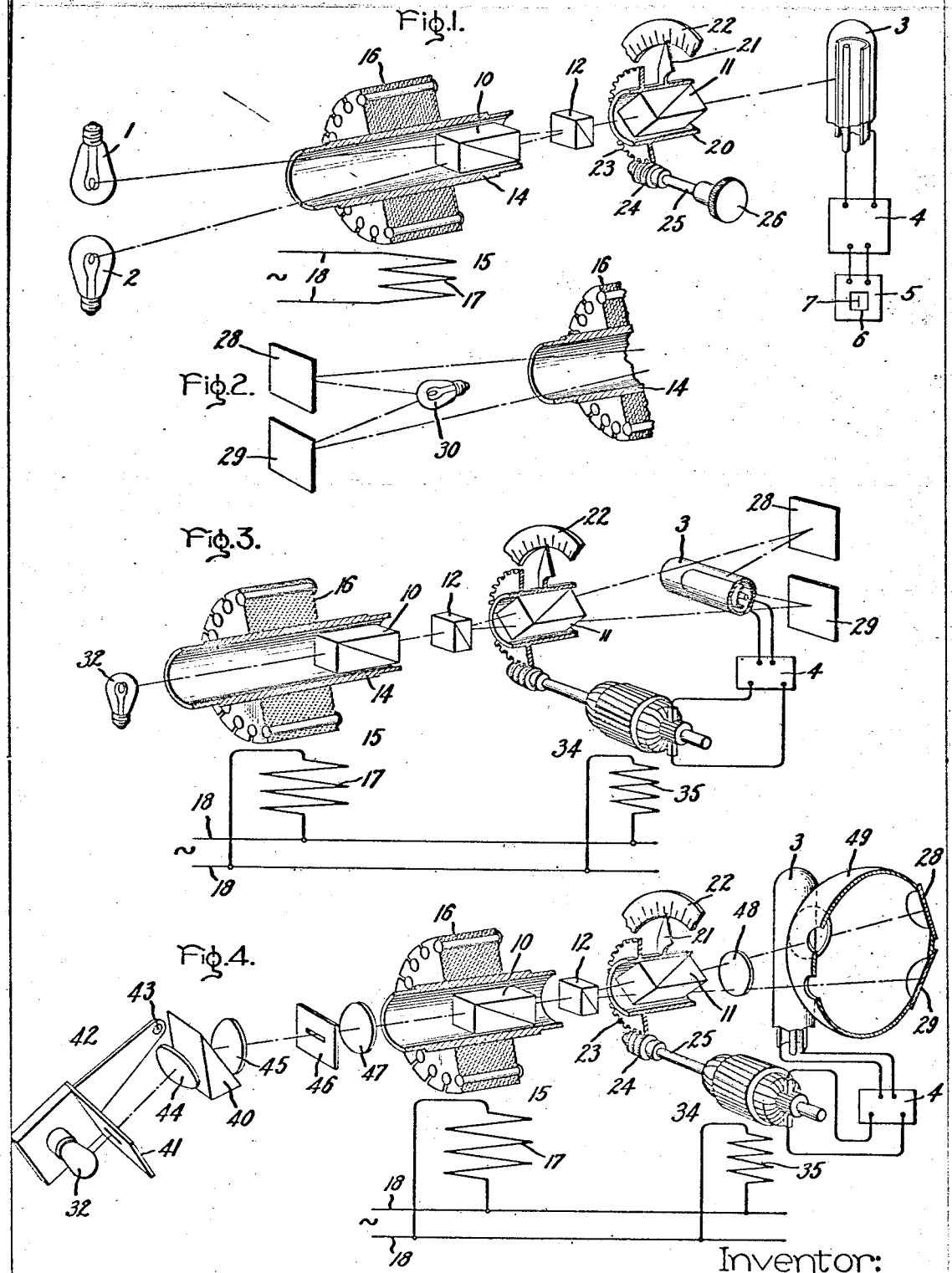
Inventor:
Arthur C. Hardy,
by [signature]
His Attorney.

Patented Jan. 8, 1935

1,987,441

UNITED STATES PATENT OFFICE 1,987,441

PHOTOMETRIC APPARATUS

Arthur C. Hardy, Wellesley, Mass., assignor to General Electric Company, a corporation of New York Application March 10, 1933, Serial No. 660,265

15 Claims. (Cl. 88—23)

My invention relates to photo-metric apparatus and particularly to photo-metric apparatus which employs a photo-electric device arranged to receive light alternately from a sample and a standard, such apparatus being particularly useful in colorimetry. In certain forms of photo-metric apparatus which I have employed heretofore the light beams from the sample and the standard to the photo-electric device traversed different optical paths. With such apparatus difficulty has sometimes arisen in obtaining a high degree of precision due to the lack of similarity of the two optical paths resulting for example from the presence of a small amount of dirt on a lens or other optical member in one of the paths. Another difficulty in such apparatus has been in making the transition from one beam to the other with sufficient smoothness to avoid an objectionable change in the output of the photo-electric device when the two beams are of equal intensity. It is the object of my invention to provide improved photo-metric apparatus which shall avoid the difficulties mentioned above.

My invention will be better understood from the following description taken in connection with the accompanying drawing, and its scope will be pointed out in the appended claims.

Referring to the drawing, Fig. 1 represents one embodiment of my invention which is adapted to be manually adjusted; Fig. 2 shows a modified form thereof; Fig. 3 shows another modified form which is automatically adjustable; and Fig. 4 shows a further modified form which employs monochromatic light.

In Fig. 1, I have shown my invention arranged for comparing the light from the two sources 1 and 2 such as incandescent lamps of which source 1 may be regarded as the unknown or sample, and source 2 a standard of comparison. By the optical means, to be described later, light from these two sources is received alternately by the photo-electric device 3, the output of device 3 being amplified by the amplifier 4 which may be of any suitable construction. In accordance with this form of my invention the amplified output impulses of the photo-electric device 3 is caused to operate the vibration galvanometer 5 in whose window 6 one may observe whether or not the indicator 7 is in a state of vibration.

The above mentioned optical system between the light sources and the photo-electric device comprises the members 10 and 11, such for example as Rochon prisms or Nicol prisms for producing plane polarization of the light passing therethrough. Intermediate these members is the member 12 which has the property of dividing a light beam into two beams which are polarized respectively in planes at right angles to each other. Such a member may be termed a double image prism and may be, for example, a Wollaston prism.

In accordance with my invention one of the two members or prisms 10 and 11 is arranged to be moved angularly about the axis of the system while the other member is arranged to be angularly adjusted about the axis of the system. As illustrated by Fig. 1 member 10 is the one which has the angular movement and this movement may be either oscillatory or rotative. I prefer that the movement of prism 10 shall be rotative and for that purpose I mount the prism within the hollow shaft 14 of the synchronous electric motor 15. This motor is represented in Fig. 1 as having the rotor 16 secured to the hollow shaft 14 and as having a field winding shown diagrammatically at 17. Where the source of alternating current supply 18 for motor 15 has a frequency of 60 cycles per second the motor preferably is constructed to rotate at thirty revolutions per second.

For conveniently adjusting the angular position of prism 11, I have shown it secured within the rotatably mounted sleeve 20 which is provided with the pointer 21 arranged to cooperate with the fixed scale 22 and which is provided with a worm wheel flange 23. This meshes with worm 24 mounted on the adjusting shaft 25 which carries the knob 26.

The operation of the apparatus shown by Fig. 1 is as follows: With the prism 11 arranged with its principal plane turned at an angle of 45° with that of the prism 12 the beams from the two light sources 1 and 2 are reduced in intensity by the same amount, since these two beams are polarized by prism 12 in planes which are mutually at right angles to each other. As prism 10 is rotated light passes through prisms 10 and 12 to the photo-electric device alternately from one source and then the other for it will be seen that in one position of prism 10 its plane of polarization will correspond with the plane of polarization of one of the two beams of prism 12 while in another position of prism 10 angularly displaced 90° from the first position the plane of polarization will correspond with that of the other beam. If the two light sources 1 and 2 are of the same intensity the light received by the photo-electric device will undergo no change incident to the rotation of prism 10 as the light from one source increases at the same rate that the light from the other source decreases. Since therefore the light reaching the photo-electric device is constant the vibration galvanometer 5 will remain in a state of rest. If the sample light source 1 is of greater intensity than the standard 2 the light reaching the photo-electric device will produce a sinusoidal variation in the current therein, the frequency being twice the frequency of revolution of prism 10. The resulting electric impulses applied to the galvanometer 5 will cause the indicator 7 thereof to vibrate. Likewise if the sample light source 1 is of less intensity than the standard the light reaching the photo-electric tube also will generate a sinusoidal current variation and the indicator 7 of the galvanometer will vibrate as before. The operator upon observing movement of the indicator 7 will turn the knob 26 in one direction or the other to change the angle of prism 11 thereby to reduce the amount of light reaching the photo-electric device from the more intense light source and increase it from the other. This adjustment will be continued until the light reaching the photo-electric device 3 is constant and the indicator 7 is seen to stand at rest. By suitably calibrating the scale 22 one may read directly the intensity of the sample light source in suitable units.

In the modified form of my invention illustrated by Fig. 2, I have shown the light sources as comprising reflecting surfaces 28 and 29 which may be illuminated by a single light source 30 which source it will be understood is suitably shielded so that direct light therefrom will not enter the optical system.

In the modification illustrated by Fig. 3 the light passes through the optical system in the reverse manner to that of Fig. 1. In this case also the sample and standard are light reflecting surfaces 28 and 29 as in Fig. 2. The source of light in this case is represented as the lamp 32 and the photo-electric device 3 is so positioned that it will receive the light reflected from the sample and standard without casting a shadow thereon. In this form of my invention the angular adjustment of prism 11 is effected automatically in accordance with light impulses received by the photo-electric device 3. The sinusoidal variations in the current received from device 3 are amplified and are fed to the armature circuit of the alternating current commutator motor 34 whose field winding 35 is supplied from the same source of alternating current 18 as is the field winding 17 of motor 15. This arrangement is similar to that disclosed in my prior Patent 1,799,134 of March 31, 1931. With this arrangement if equal amounts of light are received alternately from the sample and the standard motor 34 will not rotate in either direction. If on the other hand the reflecting powers of the sample and standard are unequal, impulses will be received from the photo-electric device and the motor will be operated in one direction if the sample reflects more than the standard and in the opposite direction if the sample reflects less than the standard. The connection between the motor and prism 11 is such as to turn the prism in the proper direction in either case to produce a balance in the light received by the photo-electric device from the sample and standard and as soon as this balanced condition is attained the motor automatically ceases rotating. The apparatus therefore automatically indicates on the scale 22 the relative reflecting powers of the sample and standard.

In the modified form shown by Fig. 4 the sample 28 and standard 29 are arranged to be illuminated by monochromatic light. For this purpose light from a suitable source 32 is passed through the prism 40 thereby producing a spectrum. For selectively employing any desired part of the spectrum I have shown the light source 32 together with the slit plate 41 mounted on the swinging arm 42 whose pivotal center 43 is in alinement with the prism 40. Lenses 44 and 45 are shown at either side of the prism 40 and a slit plate 46 and lenses 47 and 48 are also shown in accordance with the well known arrangement found in the conventional collimator and telescope of spectrographic apparatus. In this form of my invention, I have chosen to show sample 28 and standard 29 applied to openings in the intergrating sphere 49 and the photo-electric device 3 applied to another opening thereof. In this arrangement I employ the same means for automatically adjusting prism 11 as I have already described above in connection with Fig. 3. By varying the position of the arm 42 carrying the light source 32 readings may be taken from scale 22 of the various reflecting powers of the sample and standard when illuminated by the different portions of the spectrum.

I have chosen the particular embodiments described above as illustrative of my invention and it will be apparent that various other modifications may be made without departing from the spirit and scope of my invention which modifications I aim to cover by the appended claims.

What I claim as new and desire to secure by Letters Patent of the United States, is:

1. Photo-metric apparatus comprising a photo-electric device arranged to receive light from a sample and a standard, an optical system arranged to control the light received by said device comprising an angularly movable polarizing member, a member having the property of dividing a light beam into two beams which are polarized respectively in planes at right angles to each other and a second polarizing member, means for rotating the first polarizing member and means by which the second polarizing member may be angularly adjusted in accordance with the output of said photo-electric device.

2. Photo-metric apparatus comprising a photo-electric device, an optical system arranged to be traversed by light which reaches said device from a sample and a standard whereby the light from the sample and a standard may be compared, said optical system including a plurality of polarizing prisms and an intermediate prism having the property of dividing a light beam into two beams which are polarized in planes respectively at right angles to each other, means for angularly moving one of said polarizing prisms and means for angularly adjusting the other of said polarizing prisms to cause said photo-electric device to have a predetermined output.

3. In apparatus of the character described an optical system comprising a polarizing prism mounted for angular movement, a prism constructed to divide a light beam into two beams which are polarized respectively in planes at right angles to each other and a second polarizing prism having means for producing angular adjustment thereof, said prisms being arranged on a common axis.

4. In apparatus of the character described an optical system comprising a Rochon prism, a Wollaston prism and a second Rochon prism arranged in alinement, said second Rochon prism having means whereby its angular position may be varied and said first Rochon prism having means whereby it may be continuously rotated.

5. In combination, a source of light, a photo-electric device arranged to receive said light, an optical system between said source and said device comprising a plurality of polarizing prisms and a prism constructed to divide a light beam into two beams which are polarized respectively in planes at right angles to each other, one of said polarizing prisms being mounted for angular adjustment and a motor having a rotor constructed to support the other of said polarizing prisms and arranged in the path of said light.

6. In combination, an electric motor comprising a stator and a rotor having a hollow shaft and an optical system including a polarizing prism mounted within said hollow shaft whereby light rays may pass through the hollow shaft and the prism.

7. In combination, a source of light, a photo-electric device arranged to receive said light, an optical system between said source and said device comprising a first Nicol prism, a Wollaston prism and a second Nicol prism, a synchronous motor having a hollow rotor shaft arranged in the path of said light, said first Nicol prism being mounted within said hollow shaft and means for angularly adjusting said second Nicol prism.

8. Apparatus for comparing the light from a sample and a standard comprising a photo-electric device arranged to receive light from the sample and standard, optical means arranged to control the light received by said device comprising a rotatable polarizing prism, a prism having the property of dividing a light beam into two beams which are polarized respectively in planes at right angles to each other and a second polarizing prism, a member responsive to the output of said photo-electric device and means whereby said second polarizing prism may be angularly adjusted in accordance with the operation of said member.

9. Apparatus for comparing the light from a sample and a standard comprising a photo-electric device arranged to receive light from the sample and standard, optical means arranged to control the light received by said device comprising a rotatable polarizing prism, a prism having the property of dividing a light beam into two beams which are polarized respectively in planes at right angles to each other and a second polarizing prism, indicating means responsive to variations in output of said photo-electric device and means whereby the second prism may be angularly adjusted in accordance with the operation of the indicating means.

10. Apparatus for comparing the light from a sample and a standard comprising a photo-electric device arranged to receive light from the sample and standard, optical means arranged to control the light received by said device comprising a rotatable polarizing prism, a prism having the property of dividing a light beam into two beams which are polarized respectively in planes at right angles to each other and a second polarizing prism, a vibration galvanometer connected with said device and means for manually adjusting the angular position of the second polarized prism in accordance with the observed operation of said galvanometer.

11. Apparatus for determining the light reflecting power of a test sample compared with that of a standard comprising a light source, an optical system in the path of light from the source to the sample and standard comprising a rotatable polarizing member, means for rotating the member, a member for dividing a light beam into two beams directed toward the sample and the standard respectively and polarized at right angles to each other and an angularly adjustable polarizing means, a photo-electric device arranged to receive the light reflected from the sample and standard and means responsive to the output of said photo-electric device for changing the adjustment of said adjustable polarizing means.

12. In combination, a source of light, a photo-electric device arranged to receive said light, an optical system between said source and said device comprising a plurality of polarizing prisms and a prism constructed to divide a light beam into two beams which are polarized respectively in planes at right angles to each other, means for rotating one of said polarizing prisms and a motor controlled by the output of said device for angularly adjusting another of said polarizing prisms.

13. In combination, a source of light, a photo-electric device arranged to receive said light, an optical system between said source and said device comprising a plurality of polarizing prisms and a prism constructed to divide a light beam into two beams which are polarized respectively in planes at right angles to each other, means for rotating one of said polarizing prisms and means for angularly adjusting another of said polarizing prisms in one direction or the other depending upon the phase relation of said one polarizing prism and the output impulses of said device.

14. In combination, a source of light, a photo-electric device arranged to receive said light, an optical system between said source and said device comprising a plurality of polarizing prisms and a prism constructed to divide a light beam into two beams which are polarized respectively in planes at right angles to each other, a source of alternating current, a synchronous motor connected therewith and arranged to rotate one of said polarizing prisms, and a motor having field and armature elements arranged to angularly adjust another of said polarizing prisms, one of said elements being energized from said source and the other being energized from said device.

15. In combination, a source of light, a prism associated therewith for producing a spectrum, an integrating sphere having means for attaching thereto a sample and a standard arranged to be illuminated selectively by various portions of said spectrum, a photo-electric device arranged to receive light reflected by the sample and standard, an optical system between the prism and the sphere comprising a rotatable polarizing prism, a prism for dividing a light beam into two beams which are polarized in planes respectively at right angles to each other and an angularly adjustable polarizing prism and means responsive to the output of the photo-electric device for adjusting the last mentioned polarizing prism.

ARTHUR C. HARDY.